(12) United States Patent
Kennedy, Jr. et al.

(10) Patent No.: US 7,519,373 B2
(45) Date of Patent: Apr. 14, 2009

(54) SYSTEM AND METHOD FOR GEO-LOCATION OF MOBILE APPLIANCES USING DIVERSE STANDARD TASKING AND REPORTING

(75) Inventors: Joseph P. Kennedy, Jr., Great Falls, VA (US); Thomas B. Gravely, Herndon, VA (US); Andrew Beck, Ashburn, VA (US); Michael Corcoran, Leesburg, VA (US); Bob Brickhouse, Reston, VA (US)

(73) Assignee: Andrew LLC, Hickory, NC (US)

( * ) Notice: Subject to any disclaimer, the term of this patent is extended or adjusted under 35 U.S.C. 154(b) by 346 days.

(21) Appl. No.: 10/531,043

(22) PCT Filed: Oct. 27, 2003

(86) PCT No.: PCT/US03/34147
§ 371 (c)(1),
(2), (4) Date: Oct. 18, 2005

(87) PCT Pub. No.: WO2004/098213
PCT Pub. Date: Nov. 11, 2004

(65) Prior Publication Data
US 2006/0111124 A1      May 25, 2006

Related U.S. Application Data

(63) Continuation-in-part of application No. 10/230,333, filed on Aug. 29, 2002.

(60) Provisional application No. 60/421,064, filed on Oct. 25, 2002.

(51) Int. Cl.
*H04M 11/00*      (2006.01)

(52) U.S. Cl. .................................. 455/456.1; 455/406
(58) Field of Classification Search ............. 455/456.1, 455/456.2
See application file for complete search history.

(56) References Cited

U.S. PATENT DOCUMENTS

| | | |
|---|---|---|
| 4,728,959 A | 3/1988 | Maloney et al. |
| 4,845,504 A | 7/1989 | Roberts et al. |
| 4,891,650 A | 1/1990 | Sheffer |
| 5,056,106 A | 10/1991 | Wang et al. |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,404,376 A | 4/1995 | Dent |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,592,180 A | 1/1997 | Yokev et al. |
| 5,675,344 A | 10/1997 | Tong et al. |
| 5,736,964 A | 4/1998 | Ghosh et al. |
| 5,787,360 A * | 7/1998 | Johnston et al. ............. 455/524 |
| 5,914,687 A | 6/1999 | Rose |

(Continued)

*Primary Examiner*—Sam Bhattacharya
(74) *Attorney, Agent, or Firm*—Duane Morris LLP (57) ABSTRACT

A novel system and method for tasking and reporting the geolocation of a mobile appliance for a wireless communications network overlay system is disclosed. Embodiments of the novel system and method allow for geolocating a mobile appliance regardless of the wireless air interface protocol standard utilized by the mobile appliance.

25 Claims, 5 Drawing Sheets

U.S. PATENT DOCUMENTS

| | | |
|---|---|---|
| 5,945,948 A | 8/1999 | Buford et al. |
| 5,959,580 A | 9/1999 | Maloney et al. |
| 5,970,413 A | 10/1999 | Gilhousen |
| 6,047,192 A | 4/2000 | Maloney et al. |
| 6,097,336 A | 8/2000 | Stilp |
| 6,108,555 A | 8/2000 | Maloney et al. |
| 6,119,013 A | 9/2000 | Maloney et al. |
| 6,127,975 A | 10/2000 | Maloney |
| 6,184,829 B1 | 2/2001 | Stilp |
| 6,191,738 B1 | 2/2001 | Pfeil et al. |
| 6,281,834 B1 | 8/2001 | Stilp |
| 6,288,675 B1 | 9/2001 | Maloney |
| 6,288,676 B1 | 9/2001 | Maloney |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,366,241 B2 | 4/2002 | Pack et al. |
| 6,400,320 B1 | 6/2002 | Stilp et al. |
| 6,463,290 B1 | 10/2002 | Stilp et al. |
| 6,571,082 B1 | 5/2003 | Rahman et al. |
| 6,603,761 B1 | 8/2003 | Wang et al. |
| 6,640,106 B2 | 10/2003 | Gutowski et al. |
| 6,646,604 B2 | 11/2003 | Anderson |
| 6,836,653 B1 * | 12/2004 | Kang ......................... 455/408 |
| 2004/0127231 A1 * | 7/2004 | Dor et al. ................. 455/456.6 |

* cited by examiner

SYSTEM AND METHOD FOR GEO-LOCATION OF MOBILE APPLIANCES USING DIVERSE STANDARD TASKING AND REPORTING

CROSS REFERENCES

This application is a CIP and claims priority benefit of co-pending non-provisional application titled "Tasking And Reporting Method And Implementation For Wireless Appliance Location Systems", Ser. No. 10/230,333, filed Aug. 29, 2002. This application also claims priority benefit of co-pending provisional application titled "Details On The Reporting In The Diverse Standard Tasking And Reporting Invention", Ser. No. 60/421,064, filed Oct. 25, 2002.

BACKGROUND

Applicant's disclosure is directed to a wireless communications network overlay for determining the location of mobile appliances.

The use of wireless communication devices such as telephones, pagers, personal digital assistants, laptop computers, etc., hereinafter referred to collectively as "mobile appliances", has become prevalent in today's society. Recently, at the urging of public safety groups, there has been increased interest in technology which can determine the geographic position, or "geolocate" a mobile appliance in certain circumstances. For example, the Federal Communication Commission (FCC) has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

To support FCC E911 rules to locate wireless 911 callers, as well as the location enabled services, the providers of wireless communication services are installing mobile appliance location capabilities into their networks. In operation, these network overlay location systems take measurements on RF transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile appliance, i.e., location of roads, dead-reckoning, topography, map matching etc.

In a network-based geolocation system, the mobile appliance to be located is typically identified and radio channel assignments determined by (a) monitoring the control information transmitted on radio channel or wireline interface for telephone calls being placed by the mobile appliance to detect calls of interest, i.e., 911, (b) a location request provided by a non-mobile appliance source, i.e., an enhanced services provider. Once a mobile appliance to be located has been identified and radio channel assignments determined, the location determining system is first tasked to determine the geolocation of the mobile appliance, and then directed to report the determined position to the requesting entity or enhanced services provider.

Mobile appliances do not all operate using a common wireless air interface protocol standard. The Telecommunications Industry of America ("TIA") and the European Telecommunications Standard Institute ("ETSI") are well known standards organizations, each publishing recognized wireless air interface protocol standards. As is known in the art, TIA and ETSI are two examples of standards bodies. Others include the Third Generation Partnership Project ("3GPP") and Third Generation Partnership Project 2 ("3GPP2"). In the past, mobile appliance geolocation implementations have been specific to the underlying wireless air interface protocol standard (i.e., network reference models, interfaces, messages, etc.) utilized by the mobile appliance being located. Thus, both TIA and ETSI have published geolocation protocol standards for use with their respective wireless air interface communication protocol standards.

The monitoring of the RF transmissions from the mobile appliance to identify calls of interest is known as "tipping", and generally involves recognizing a call of interest being made from a mobile appliance and collecting the call setup information. Once the mobile appliance is identified and the call setup/channel assignment information is collected, the location determining system can be tasked to geolocate the mobile appliance.

Various methods have been developed to define and coordinate the tasking and reporting functions. One such method involves tasking only and is described in U.S. Pat. No. 5,327,144 to Stilp. This method detects telephone calls of interest by monitoring the control channels of a wireless communication system off-the-air, i.e., receiving RF signals transmitted by the telephones, and detecting call initiations and associated call set-up information directly from the RF signals.

As discussed above, other methods of tasking and/or reporting the location of a mobile appliance can be found in well known geolocation protocol standards published by two recognized standards bodies. The TIA and ETSI each publishes its own standard for tasking and reporting the geolocation of a mobile appliance and define network entities, reference models, and interfaces required to support the geolocation of the mobile appliance.

In the case of a mobile appliance location determining system for use with TIA defined air interfaces, the call setup information includes assigned frequency, time slot or code set, and is transmitted on dedicated control channels. For TIA wireless air interface protocol standards, tipping can be accomplished off-the-air by monitoring the dedicated control channel to capture the call setup information, or via wireline interfaces defined in TIA geolocation standards containing tasking messages and data, such as J-Std-036.

In the case of a location determining system for mobile appliances using ETSI defined air interfaces, such as GSM, the call set-up information is transmitted on dynamically allocated control channels on a per-call basis. The call set-up information may also be encrypted. Thus, the ability to identify calls of interest and collect call-set up information off-the-air would require expensive radio processing and decryption resources. As a result, off-the-air tipping is not practical with ETSI defined air interfaces. Instead, the ETSI geolocation standard requires that tipping be accomplished only through monitoring messaging on wireline transmissions between network entities or through location services specific messages, and in some instances requires the mobile appliance to transmit a dedicated location signal to facilitate the geolocation of the mobile appliance.

Presently, wireless communication systems are being deployed in the United States, which operate in accordance with the TIA air interface protocol standard, the ETSI air interface protocol standard, or several other recognized standards, including some proprietary systems such as those used for enhanced special mobile radio ("ESMR"). However, until now, there has not been developed an independent network overlay including tasking and reporting for determining the location of a mobile appliance for use with the multiple dissimilar wireless air interface protocol standards due, in part, to the nature of the underlying air interfaces and associated standards bodies implementation standards. Specifically, the ETSI wireless air interface standard has characteristics, such as control channel allocation and encryption, that make it more difficult for independent network overlay equipment to successfully operate. As a result, the typical geolocation system is oriented to a specific wireless air interface protocol standard, and thus the same geolocation system can not be used to locate two different mobile appliances if the mobile appliances do not operate in networks using a common wireless air interface protocol standard.

The present disclosure is directed to a geolocation and method for locating a mobile appliance without regard to the wireless air interface protocol standard utilized by the mobile appliance. For example, in one embodiment of applicant's disclosure, the tasking is accomplished by monitoring interface points within the existing wireless network (physically wired connections) in a GSM wireless air interface system to determine that a call of interest has been placed and gather associated call set up information to allow a location estimate for the mobile appliance to be determined, and the reporting of the location determination is accomplished using the TIA defined interfaces. The interface point from where tasking is derived is a wireless air interface protocol standard "open interface" and not specific to one of the geolocation protocol standards that is specifically directed to interfaces or messages dedicated to supporting location services.

Accordingly, it is an object of the present disclosure to provide a novel system and method for tasking and reporting the geolocation of a mobile appliance.

It is another object of the present disclosure to provide a novel system and method for geolocating a mobile appliance that is compatible with dissimilar wireless air interface protocol standards.

It is yet another object of the present disclosure to provide a novel system and method for tasking and reporting the geolocation of a mobile appliance using entities operating under different wireless air interface protocol standards.

These and many other objects and advantages of the present invention will be readily apparent to one skilled in the art to which the disclosure pertains from a perusal of the claims, the appended drawings, and the following detailed description of the preferred embodiments.

DESCRIPTION OF THE PREFERRED EMBODIMENTS

To support the interfacing of the recently required location determining capability into existing, and planned, wireless networks, well known standards bodies have undertaken the task of defining network reference models, interfaces and location methodologies to support the geolocation requirement. The two principal standards bodies are the Telecommunications Industries Association ("TIA") in the United States, and the European Telecommunications Standards Institute ("ETSI") in Europe and their 3G counterparts in 3GPP and 3GPP2.

The TIA has defined a geolocation standard called TIA Standard 36 (TIA J-Std-36) which provides information to allow location services to be implemented in existing TIA defined wireless air interface networks commonly used in the United States.

The ETSI publishes its own geolocation standard for tasking and reporting. For example, the ETSI standard titled "Digital Cellular Telecommunications System Location Services" GSM 3.71, provides information to allow network overlay location systems to interface with existing Global System for Mobile Communications (GSM) defined wireless communications networks commonly used in Europe, and being used more recently in the United States.

These published geolocation standards by TIA and ETSI define network entities, reference models, and interfaces to allow mobile appliance location determining tasking and reporting.

Figure 1:
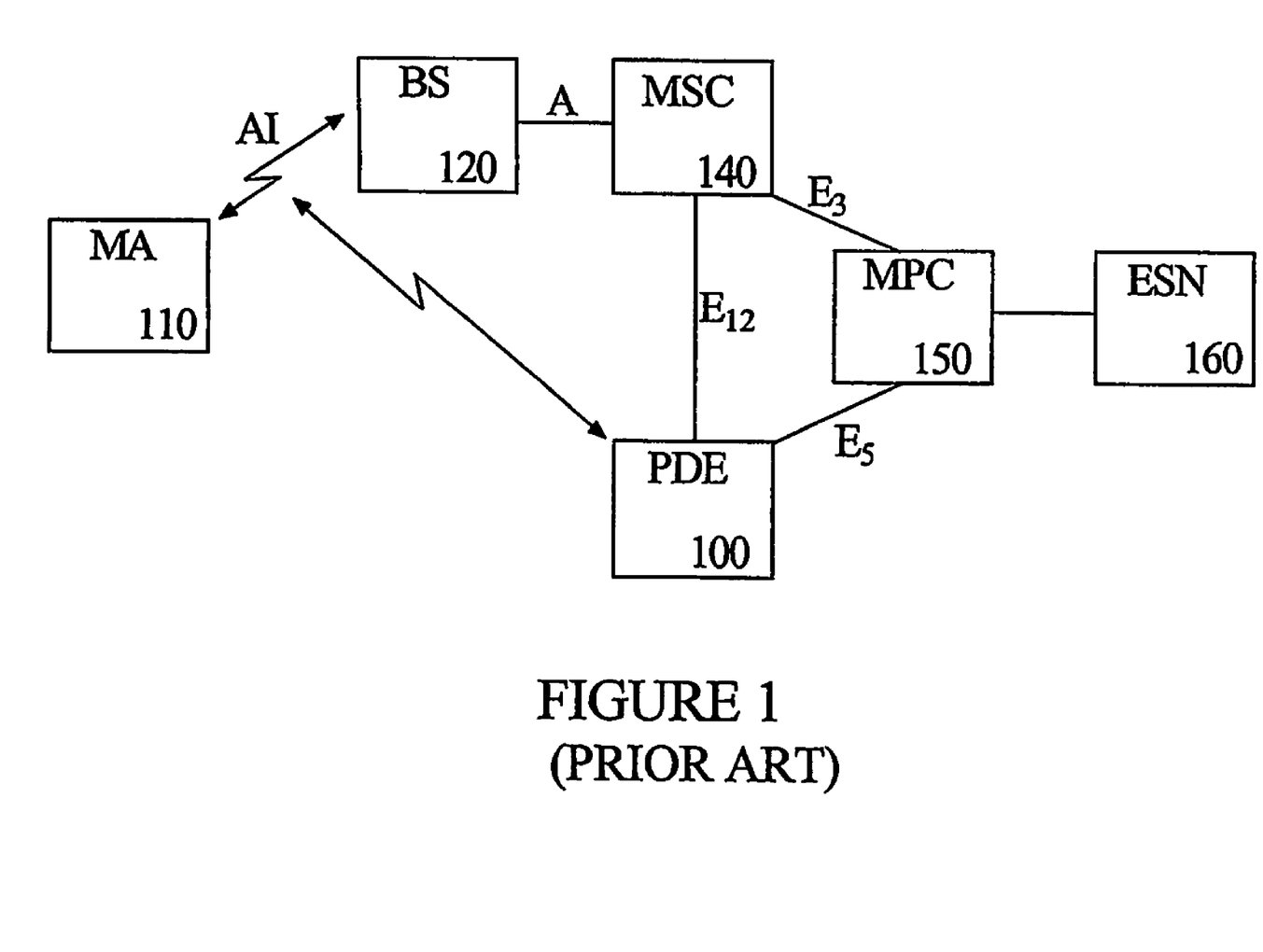
FIG. 1 is a simplified block diagram illustrating a TIA defined geolocation system reference model (TIA-J-STD-036) for use with mobile appliances governed by TIA wireless air interface protocol standards.

FIG. 1 illustrates the TIA geolocation protocol standard J-Std-36 for network overlay location systems to interface with existing communication networks in the United States. The geolocation standard covers air interfaces commonly used in the U.S such as AMPS, IS-136, and J-Std-008. For the TIA defined air interfaces, control information for call setup and management is contained on a dedicated channel and contains assigned frequency/time slot/code set information. Tasking for the network overlay location determining system can also be accomplished by off-the-air monitoring. Off the air tasking requires radio receiving and processing resources in order to identify the RF channels/time slots/code sets. In the TIA geolocation standards, tasking can also be accomplished over a wireline interface defined by the geolocation standards.

The PDE 100 is connected to the Mobile Switching Center (MSC) 140 and the Mobile Positioning Center (MPC) 150 via wireline interfaces E12 and E5, respectively. The MSC 140 is connected to the MPC 150 via a wireline interface E3.

In operation, the Position Determining Equipment (PDE) 100 may monitor the air interface (AI) between the mobile appliance 120 and the base station 130 to receive the call setup information. The PDE 100 may also receive call setup information from the MPC 150 via the E5 interface. The PDE 100 takes measurements on the RF signals as described previously and determines the location of the mobile appliance 120. The MPC 150 reports the location received from the PDE 100 to the Emergency Services Network. 160. The Emergency Services Network 160 may contain databases related to the communications network and emergency services network entities which are linked to PSAPs and enhanced services providers as is well known and therefore not discussed in detail in this disclosure.

Figure 2:
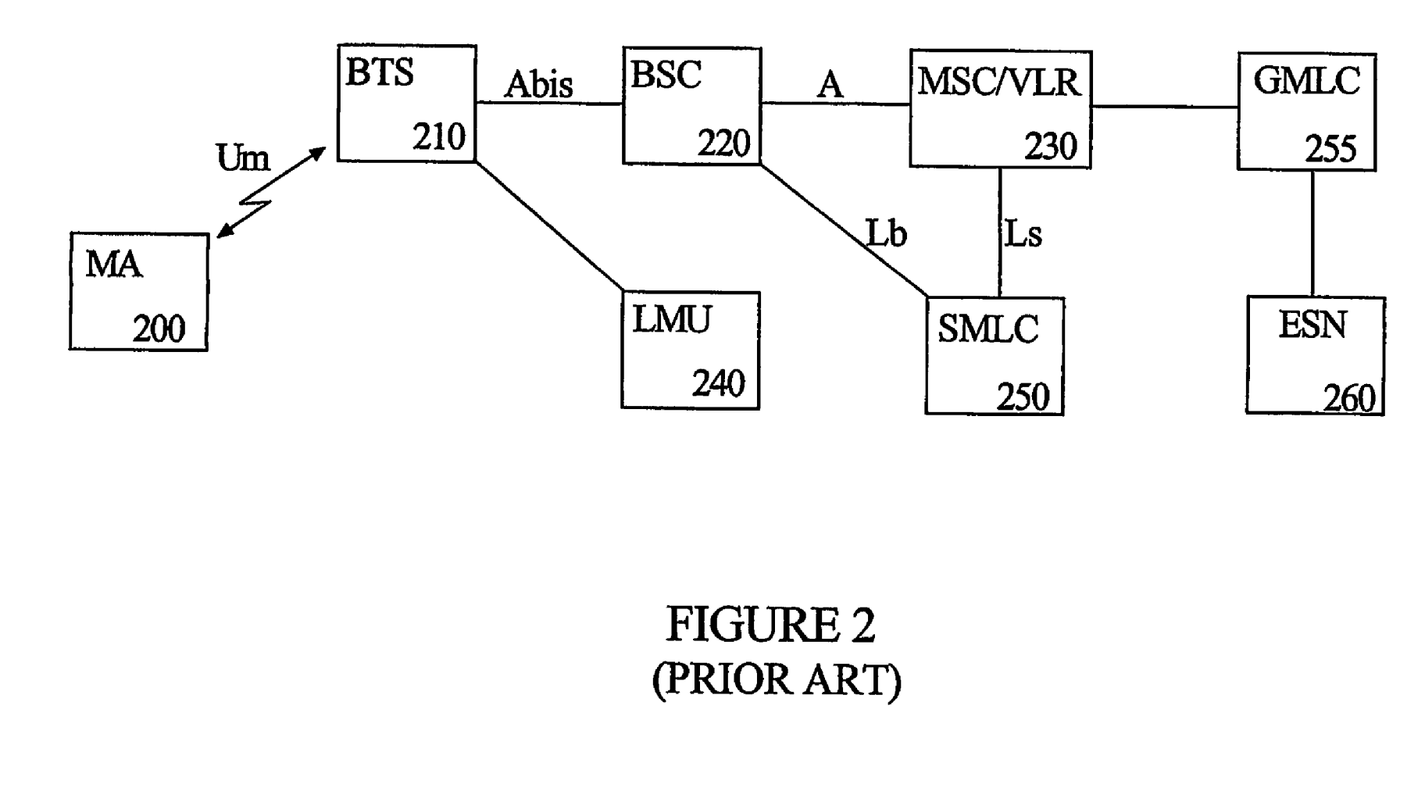
FIG. 2 is a simplified block diagram illustrating an ETSI defined geolocation system reference model (GSM 3.71) mobile appliance location determining system for use with mobile appliances governed by ETSI wireless air interface protocol standards.

FIG. 2 is a simplified block diagram of a geolocation system in accordance with ETSI GSM 3.71 geolocation protocol standard. In the case of GSM, call set up information is present not only on dedicated control channels, but also on dynamically allocated control channels on a per-call basis. Further, this information may be encrypted. Thus, this protocol standard requires that call information be captured from a wireline interface after the RF signal is received at the base station rather than off-the-air.

Mobile Station (MS) 200 communicates with the Base Transceiver Station (BTS) 210 via wireless interface Um. The Base Station Controller (BSC) 220 manages radio resource including the BTS 210 via wireline interface Abis. The Abis interface is an open interface completely defined as part of the ETSI specification for GSM and carries the call set up information, including voice channel assignments between the BSC 220 and BTS 210. The Mobile Switching Center/Visitor's Location Register (MSCNVLR) 230 coordinates between the mobile appliance communications network, the Global Mobile Location Center (GMLC) 255 and the Emergency Services Network (ESN) 260.

In operation, the Location Measurement Unit (LMU) 240 may be connected to the BTS 210 and make measurements on the RF signals on the Um interface, along with other measurements to support one or more of the positioning methods described in the ETSI standards. The measurements from the LMUs 240 and/or MAs are sent to a Serving Mobile Location Center (SMLC) 250 via BCS 220 where the position of MS 200 can be determined.

One significant difference between the TIA and ETSI geolocation standards is in the degree to which independent network overlay systems can conform to the defined communication reference model. The TIA geolocation standard is well suited to independent overlays, while the ETSI geolocation standard requires much more interaction and integration with the existing communication networks. In part, this is due to the nature of the underlying air interfaces. The GSM air interface has characteristics that make it more difficult for independent network overlay equipment to successfully operate. These characteristics include the heavy use of encryption and the mechanism by which calls are set up and managed through control channels.

For example, a network overlay solution attempting to detect calls of interests and collect call set up data from a GSM defined system to allow location determination would need to provide radio and processing resources to respond to all of the dynamically allocated control channels, as well as obtain encryption key information.

Additionally, the ETSI geolocation standard does not provide a well defined external interface to an existing GSM communications network for network overlay location system tasking or reporting. Thus, it is difficult to provide an independent network overlay location system for GSM defined systems within location oriented standards reference models, or via off the air monitoring.

Figure 3:
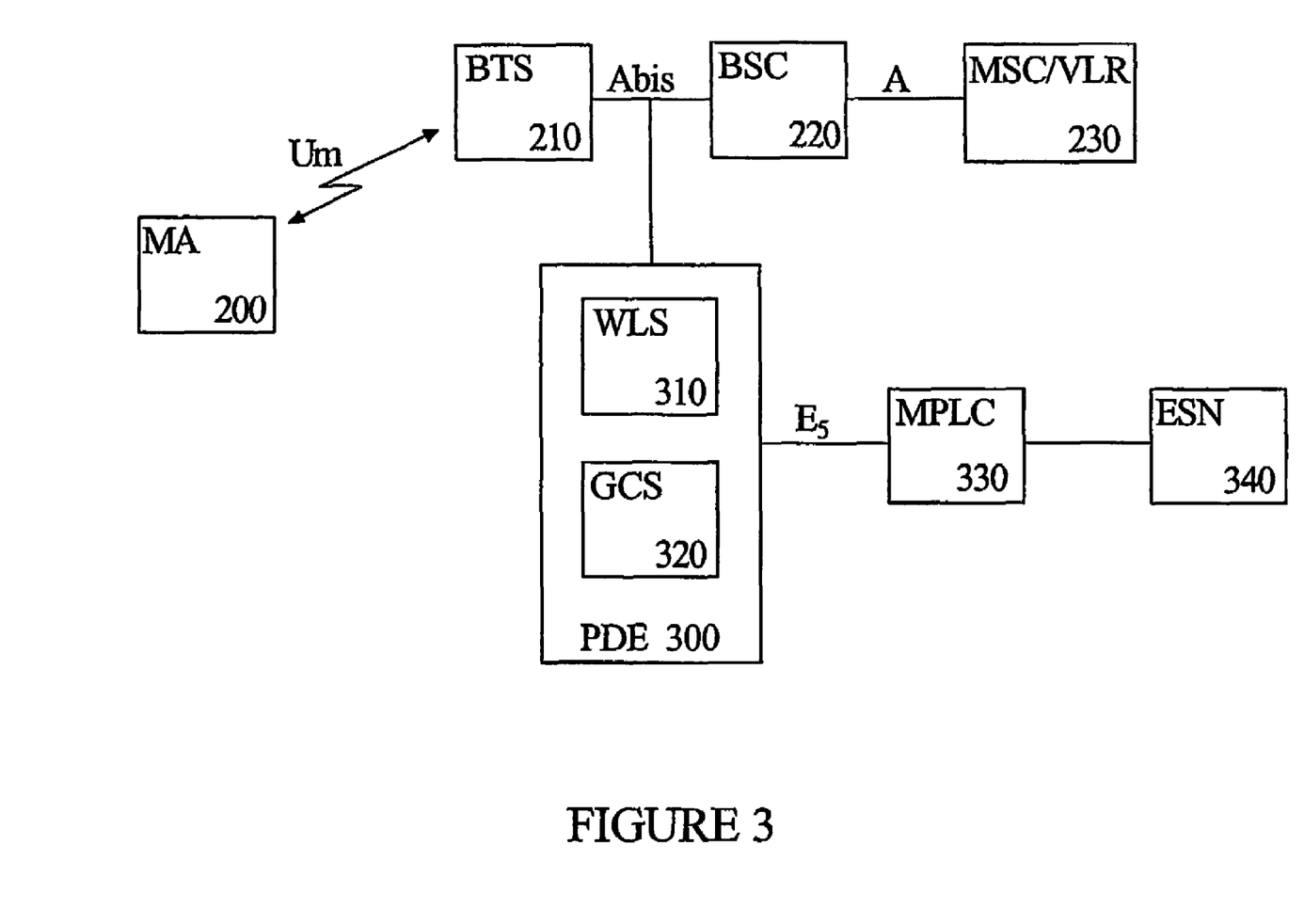
FIG. 3 is a simplified block diagram of applicant's wireless geolocation system utilizing portions of the TIA and ETSI defined entities illustrated in FIGS. 1 and 2, respectively.

FIG. 3 is a simplified pictorial diagram of one embodiment of applicant's overlay location determination system for use with a communication system defined by ETSI or TIA wireless air interface protocol standards using elements from each.

The MA 200, BTS 210, BSC 220 and MSC/VIR 230 are network entities from the ETSI GSM wireless air interface protocol standard. These entities form the basic GSM wireless air interface network and do not include the additional entities or functionality necessary for location determination as defined by the GSM geolocation standards.

PDE 300 provides the location estimates for the mobile appliance 200. PDE 300 contains a Wireless Location Sensor (WLS) 310 and Geolocation Control System (GCS) 320 which provide generic LMU and SMLC functionality, respectively as defined in the ETSI specifications.

The interfaces between elements are also derived from the specific wireless air interface protocols, with Um defining the GSM air interface, A and Abis defining wireline GSM interfaces, and E5, E2 and E11 representing TIA wireline interfaces.

In operation, mobile appliance 200 may place a call during which the location of the mobile appliance is desired (i.e. E911 is dialed). The BTS 210, BSC 220, MCS/VLR 230 receive the call request on logical control channels, perform the necessary steps to authenticate the user, and connect the call using GSM defined protocols. The call service request including dialed number are made available via the Abis interface to the PDE 300. The Abis interface is an open interface completely defined as part of the ETSI specification for GSM. The call set up information including voice channel assignment details are also made available via the Abis interface. The PDE 300 monitors the Abis interface to detect calls of interest (i.e. E911 calls), and when detected, reads the call setup information. The PDE 300 uses the call setup information to collect RF emissions from the mobile appliance 200, and calculates a location estimate using one of the well known techniques mentioned previously. The PDE 300 reports the call occurrence (along with the caller identity), and the location estimate through the E5 interface to the Mobile Positioning Location Center (MPLC) 330. This "push" mode of reporting is supported in J-Std-036. The MPLC 330 performs the call routing and sends location and other information to emergency services network 340 or other value added services applications.

The Abis interface monitoring is a logical function that could be done with a separate unit or can be done within the WLS 310. This is convenient since the WLS 310 may be co-located with the BTS 210 in many cases. The Abis interface monitoring can also be done within the GCS 320. This is convenient since the GCS 320 may be co-located with the BCS 220 in some cases.

One approach in a wireless network with ETSI and TIA protocols monitors the Abis interface, looking for 911 calls. Once a 911 call is detected, information about the call traffic channel assignment is collected to allow the system to tune to the correct traffic RF channel, time slot, etc. to collect location-oriented measurements as described previously. The messaging on the Abis interface identifies the mobile phone that is placing the call using one of two indicators, either the International Mobile Subscriber Identity (IMSI) or the Temporary Mobile Subscriber Identity (TMSI). The tasking message over the E5 interface identifies the calling mobile by the mobile phone number or an equivalent such as the MSISDN. Thus the two interfaces identify the mobile phone using two different means that the system cannot link. However. as part of the information coming over the Abis interface, the PDE system can know the serving site and sector of the call, and the approximate time of the call. Furthermore, as part of the tasking information received over the E5 interface, the PDE system is told the serving site and sector and the approximate time of the call.

Figure 4:
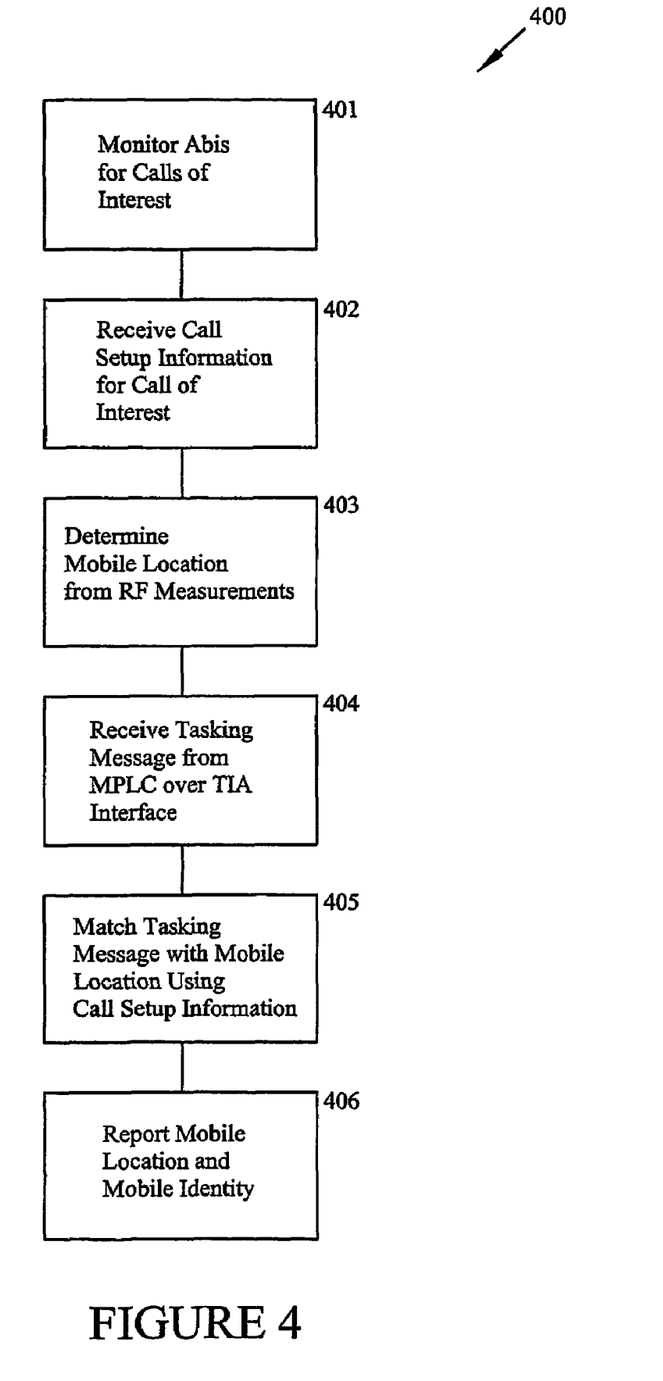
FIG. 4 is a representative flow chart for an embodiment of the disclosed subject matter in which call set up information is used to link the determined location with the mobile appliance.

In one embodiment of the disclosed subject matter, the PDE system is tasked on the Abis interface and reports the location to the MPLC over the E5 (ANSI, TIA) interface. The MPLC is the network entity connected to the system (PDE) over the E5 interface, and will task the system to locate the 911 call. The PDE system can use the serving site and sector and time of the call received from both the Abis interface and the E5 interface to link the information from the two and thus associate the determined location with the mobile identified by the E5 interface. The PDE system locates the call, and then reports the location in response to the tasking using the mobile phone number or a tasking transaction identifier, which the MPLC understands. FIG. 4 is a representative flow chart 400 according to this embodiment.

In FIG. 4, the PDE system monitors the Abis interface for a call of interest, for example a call to 911, since the dial number is available on the Abis interface in block 401. The PDEs system receives the call setup or call request information from the Abis interface related to the call of interest in block 402. The PDE uses this information to tune to the channel and make measurements of the RF signal at a plurality of WLSs which are used to determine the location of the mobile appliance requesting the call in block 403. The PDE system in block 404 simultaneously or subsequently receives a tasking message from the MPLC over the TIA interface, which can include the serving cell, serving sector or time of request in block 404. Using the call request information, the PDE system matches the serving cell, serving sector and/or time of call from the tasking message with the serving cell, serving sector and/or time of call request associated with call request information used to located the mobile appliance in block 405. The PDE system then reports the location and identity of the mobile to the MPLC. While this example utilizes serving cell, serving sector and or time of call requests other information obtained through the Abis and contained in the tasking message can be used to link the determined location with a particular mobile appliance.

Figure 5:
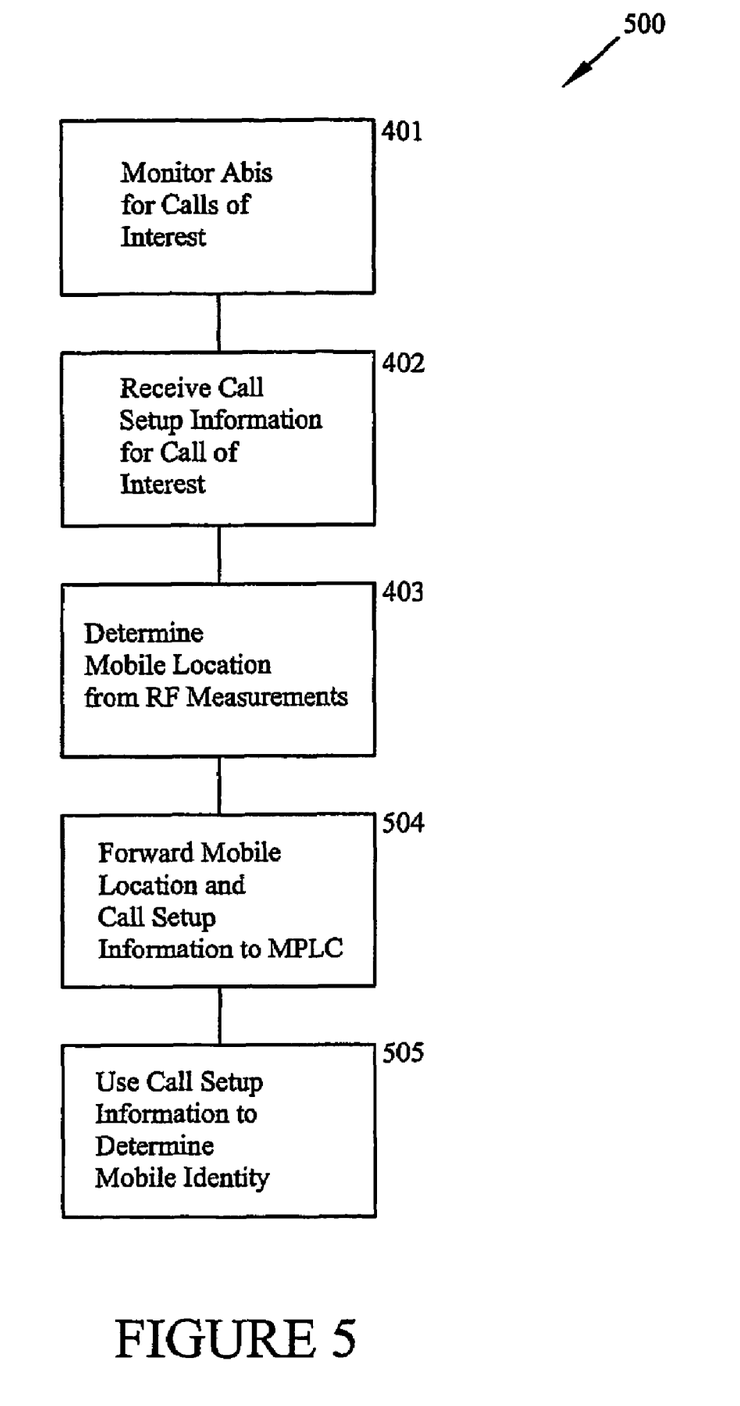
FIG. 5 is a representative flow chart for an embodiment of the disclosed subject matter in which call set up information and determined location is pushed to the MPLC to determine the mobile appliance identity.

In another embodiment, the system pushes a location to the MPLC without a tasking request. The location is linked to the mobile appliance that was located using either the IMSI of the TMSI. A push message containing the serving site and sector of the mobile and optionally the estimated time of the call is forwarded to the MPLC. The MPLC can now perform a similar matching operation to determine the location reported belongs to a certain mobile phone identified by its phone number. Additionally, if the time of the call is not part of the push messaging, then the time of the pushed location message can be used as a time of call estimate. This is possible since the MPLC, taking into account the time the PDE system generally takes to generate a location after receiving a call initiation message of the Abis interface, can determine the time of call estimate. FIG. 5 illustrates a flow chart 500 representing this embodiment.

In FIG. 5, the PDE system monitors the Abis interface for a call of interest, in block 401. The PDE system receives the call setup or call request information from the Abis interface related to the call of interest in block 402. The PDE determine the location of the mobile appliance requesting the call in block 403. The PDE system in block 504 forwards the mobile location and the call set up information to the MPLC and the MPLC uses the call set up information to match the identity of the mobile appliance in block 505. This is possible since a mobile's determined location can be associated with call set up or request information and portions of the call set up or request information is also included in tasking messages along with the mobiles of interests identification. The determined location can be linked to a particular mobile whether in the PDE system or in the MPLC as a result of a push message.

Thus, in one embodiment of applicant's disclosure a GSM defined wireless air interface system allows an independent network overlay location systems to be tasked via a GSM defined wireline interface and reported through a TIA defined interface. The tasking method does not rely on off the air signaling collection, nor on the GSM geolocation protocol standards. The tasking method can detect a call of interest initiation and capture call set up data necessary for traffic channel location without off-the-air receiving equipment or methods. The method requires no modifications to the underlying wireless infrastructure equipment to provide a specific tasking interface or reporting interface. Additionally, the tasking method does not rely on direct or indirect interfacing to the mobile switch.

In one embodiment of the present disclosure, the tasking method uses wireless air interface protocol standard defined interfaces. The method produces reporting that is J-Std-036 compliant for air interfaces not necessarily included in or supported by the J-Std-036 standard reference model, such as GSM air standards. This embodiment provides a convenient interface point, the WLS or GCS, within a current common network entity, the BTS or BSC/MSC, in location network overlay systems to interface to the wireless infrastructure equipment, the Abis interface, and relay data to GCS for tasking.

Thus, this embodiment describes a method of tasking a communications system defined by the GSM wireless air interface protocol to locate a mobile appliance and to report the determined location of the mobile appliance using the TIA defined entities. Note that although this disclosure has described protocols with respect to TIA and ETSI defined standards, this disclosure may be equally applicable to other defined standards such as the enhanced specialized mobile radio systems (ESMR) standards.

Unlike the typical wireless geolocation system, applicant's disclosure is not specific to a particular wireless air interface protocol standard, and can be used to locate plural mobile appliances even if the mobile appliances are not operating using a common wireless air interface protocol standard. For example, one embodiment of applicant's disclosure may be used to locate a mobile appliance operating using a TIA defined air interface standard, and also may be used to locate a mobile appliance operating using a ETSI defined air interface standard.

While preferred embodiments of the present invention have been described, it is to be understood that the embodiments described are illustrative only and the scope of the invention is to be defined solely by the appended claims when accorded a fall range of equivalents, many variations and modifications naturally occurring to those skilled in the art from a perusal hereof.

What is claimed:

1. A method of determining the geographic coordinate location of a mobile appliance and providing the geographic coordinate location to a mobile positioning location center (MPLC) without regard to the wireless air interface protocol standard utilized by the mobile appliance in a wireless communication system having plural base stations for communicating with the mobile appliance and a base station controller for managing the plural base stations, comprising the steps of:
   (a) placing a call request from a mobile appliance;
   (b) processing the call request at the base station controller on a first interface;
   (c) detecting a call of interest by monitoring the first interface;
   (d) retrieving the call request information for the detected call of interest;
   (e) determining the geographic coordinate location of the mobile appliance;
   (f) receiving a tasking message from the MPLC over a second interface;

(g) matching the tasking message and the determined geographic coordinate location using the call request information; and, (h) reporting the determined geographic coordinate location and identity of the mobile appliance to the MPLC using the second interface.

2. The method of claim 1 wherein the first interface is an Abis interface.

3. The method of claim 1 wherein the second interface is an E5 interface.

4. The method of claim 1 wherein the call request information includes information selected from the group of serving cell information, serving sector information, and time of request information.

5. The method of claim 1 wherein the tasking message includes call information selected from the group of serving cell, serving sector and time of request.

6. The method of claim 1 wherein the tasking message includes the identity of the mobile appliance.

7. The method of claim 6 wherein the identity of the mobile appliance is the mobile appliance's phone number.

8. The method of claim 1 where in the call of interest is detected by number dialed.

9. A method of determining the geographic coordinate location of a mobile appliance and providing the geographic coordinate location to a mobile positioning location center (MPLC) without regard to the wireless air interface protocol standard utilized by the mobile appliance in a wireless communication system having plural base stations for communicating with the mobile appliance and a base station controller for managing the plural base stations, comprising the steps of:

(a) placing a call request from a mobile appliance;

(b) processing the call request at the base station controller on a first interface;

(c) detecting a call of interest by monitoring the first interface;

(d) retrieving the call request information for the detected call of interest;

(e) determining the geographic coordinate location of the mobile appliance; and, (f) forwarding the geographic coordinate location and the call request information to the MPLC over a second interface.

10. The method of claim 9 wherein the first interface is an Abis interface.

11. The method of claim 9 wherein the second interface is an E5 interface.

12. The method of claim 9 wherein the call request information includes information selected from the group of serving cell information, serving sector information, and time of request information.

13. The method of claim 12 wherein the time of call request is a function of a time of receipt of the geographic coordinate location and call request information at the TALC.

14. The method of claim 13 wherein the time of call request is the time receipt minus a known time to determine the mobile appliance's geographic coordinate location.

15. The method of claim 9 where in the call of interest is detected by number dialed.

16. In a wireless communication system for communication between the system and a mobile appliance, in which the wireless communication system has a plurality of bases stations, each connected by a wireline interface to a base station controller and the wireless communication system includes a PDE network overlay connected to the wireline interface and connected to a MPLC over second interface, a method for reporting a geographic coordinate location of a mobile appliance without regard to the wireless air interface protocol standard utilized by the mobile appliance comprising the steps of:

determining the geographic coordinate location of a mobile appliance and associating the geographic coordinate location with call set information obtained from the wireline interface;

receiving a tasking message including call setup information and mobile appliance identity from the MIPLC over the second interface; and, matching the geographic coordinate location of the mobile appliance with an identified mobile appliance via the call setup information and reporting the identified mobile appliance and geographic coordinate location to the MPLC.

17. The method of claim 16 wherein the wireline interface is an Abis interface.

18. The method of claim 16 wherein the second interface is an E5 interface.

19. The method of claim 16 wherein the call request information includes information selected from the group of serving cell information, serving sector information, and time of request information.

20. In a wireless communication system for communication between the system and a mobile appliance, in which the wireless communication system has a plurality of bases stations, each connected by a wireline interface to a base station controller and the wireless communication system includes a PDE network overlay connected to the wireline interface and connected to a MPLC over second interface, a method for associating a geographic coordinate location with an identified mobile appliance without regard to the wireless air interface protocol standard utilized by the mobile appliance comprising the steps of:

determining the geographic coordinate location of a mobile appliance and associating the geographic coordinate location with call set up information obtained from the wireline interface;

forwarding the geographic coordinate location and call set up information to the MPLC over the second interface; and, matching the geographic coordinate location of the mobile appliance with the identified mobile appliance via the call setup information in the MPLC.

21. The method of claim 20 wherein the wireline interface is an Abis interface.

22. The method of claim 20 wherein the second interface is a E5 interface.

23. The method of claim 20 wherein the call request information includes information selected from the group of serving cell information, serving sector information, and time of request information.

24. The method of claim 23 wherein the time of call request is a function of a time of receipt of the geographic coordinate location and call request information at the MPLC.

25. The method of claim 24 wherein the time of call request is the time receipt minus a known time to determine the mobile appliance's geographic coordinate location.

* * * * *